US006850950B1

(12) United States Patent
Clarke et al.

(10) Patent No.: US 6,850,950 B1
(45) Date of Patent: Feb. 1, 2005

(54) METHOD FACILITATING DATA STREAM PARSING FOR USE WITH ELECTRONIC COMMERCE

(75) Inventors: William D. Clarke, Northampton, MA (US); James P. Flynn, Tappan, NY (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/502,314

(22) Filed: Feb. 11, 2000

Related U.S. Application Data (60) Provisional application No. 60/119,777, filed on Feb. 11, 1999.

(51) Int. Cl.[7] .............................................. G06F 17/30
(52) U.S. Cl. ................. 707/102; 707/104.1; 715/500.1; 715/501; 715/513; 358/403
(58) Field of Search .................... 707/1–10, 100–104.1, 707/200–205, 501.1–533; 709/203–215; 717/109–117, 142–147, 125–129, 137; 345/760, 854; 715/500.1, 501, 510–513; 358/402–403

(56) References Cited

U.S. PATENT DOCUMENTS

| | | | | |
|---|---|---|---|---|
| 5,457,792 A | * | 10/1995 | Virgil et al. | 707/104.1 |
| 5,675,801 A | | 10/1997 | Lindsey | |
| 5,835,690 A | * | 11/1998 | Duniho | 358/1.13 |
| 5,893,131 A | * | 4/1999 | Kornfeld | 707/531 |
| 5,903,756 A | * | 5/1999 | Sankar | 717/106 |
| 5,966,535 A | * | 10/1999 | Benedikt et al. | 707/10 |
| 5,973,696 A | * | 10/1999 | Agranat et al. | 345/760 |
| 6,021,416 A | * | 2/2000 | Dauerer et al. | 707/200 |
| 6,031,625 A | | 2/2000 | Sherman et al. | 358/1.18 |
| 6,091,896 A | * | 7/2000 | Curreri et al. | 717/125 |
| 6,105,036 A | * | 8/2000 | Henckel | 345/419 |
| 6,125,391 A | * | 9/2000 | Meltzer et al. | 370/466 |
| 6,148,289 A | * | 11/2000 | Virdy | 705/1 |
| 6,182,283 B1 | * | 1/2001 | Thomson | 717/153 |
| 6,279,006 B1 | * | 8/2001 | Shigemi et al. | 707/100 |

FOREIGN PATENT DOCUMENTS

| | | |
|---|---|---|
| EP | 0 631 244 A2 | 12/1994 |
| EP | 1037151 * 9/2000 | 17/21 |
| WO | WO 02/21324 * 3/2002 | 17/20 |

OTHER PUBLICATIONS

Klein E et al.: "The Parser Generating System PGS" Software Practice & Experience, GB, John Wiley & SonsLtd. Chichester, vol. 19, No. 11, Nov. 1, 1989, pp. 1015–1028.

Klein B. et al., "Error Tolerant Document Structure Analysis", Proc. IEEE Int. Forum on Research and Technology Advances in Digital Libraries, ADL '97, May 7–9, 1997, pp. 116–127.

* cited by examiner

*Primary Examiner*—Srirama Channavajjala
(74) *Attorney, Agent, or Firm*—Michael J. Cummings; Charles R. Malandra, Jr.; Angelo N. Chaclas

(57) ABSTRACT

A parsing technique suitable for use in electronic commerce that avoids the disadvantages of known monolithic parsers. The parsing system generates code specific to each input document and data stream type, which may then be updated as needed to handle document-specific idiosyncrasies without requiring modifications to the core parser code. As a user (10) defines parsing rules for extracting data from a representative sample document (15), a visual trainer (16) automatically generates code in the background, referred to as a filer (17), that is specific to that document and that embodies the rules for extracting data from that particular document. The generated code may be modified manually (18) as needed to account for any idiosyncratic conditions associated with the document. Each representative document has associated with it its own filer. A parsing engine (20, 21) comprises a collection of such individual filers appropriate for the types of documents that arise in any given organization. A mapping or other association is maintained between representative document types and their filers. In regular operation, a user selects a data set to be extracted from certain documents. When the parsing engine receives a document in an input data stream, the associated filer is loaded and parses that document for the selected data set. Then another filer is loaded in response to another input document, and so on. The filers may be especially efficiently generated using an object-oriented approach and then dynamically instantiated at run time as may be conveniently achieved, for example, in the Java programming language.

10 Claims, 4 Drawing Sheets

METHOD FACILITATING DATA STREAM PARSING FOR USE WITH ELECTRONIC COMMERCE

This application claims the benefit of Provisional application No. 60/119,777 filed Feb. 11, 1999.

BACKGROUND OF THE INVENTION

The present invention relates to data parsing from various electronic data formats such as legacy print stream files, electronic data interchange (EDI) files, Extensible Markup Language (XML) files, and structured text formats for use in electronic commerce such as electronic bill presentment and electronic statements, as well as for assisting in integration of legacy systems.

More and more organizations are finding themselves pressed to conduct business electronically (so-called e-business) over the internet or other computer networks. E-business calls for specialized applications software such as Electronic Bill Presentment and Payment (EBPP) applications and Electronic Statement Presentment (ESP) applications. To implement such applications, traditional paper documents have to be converted to electronic form which may be processed electronically and exchanged over the internet or otherwise with customers, suppliers or others. The paper documents will typically be formatted as Hypertext Markup Language (HTML) Web pages, e-mail messages, XML messages, or other electronic formats suitable for electronic exchange, processing, display and/or printing.

Consider, for example, a telephone company that is in the process of implementing an EBPP service. Any EBPP implementation must be integrated with the organization's existing billing systems. The straightforward approach to integrating the billing systems would be simply to get the data from the existing billing system's database and use that data in the new e-business system. This approach, however, is not as simple as it may seem. Many legacy systems do not have a standard interface for data extraction and, moreover, the information required to create an electronic document often does not exist in any one easily accessible database format. The telephone company for example might maintain three different databases feeding into its legacy billing application: (1) A customer information database containing account numbers, calling plans, addresses and other customer profile information—this database would tend to be updated infrequently; (2) a rate and tariff database containing the rate structure used to calculate the cost of calls, which is typically based on geographic zones, time of day and the like—this database would tend to be updated periodically; (3) a transaction database containing the transaction history of the calls made by customers, including number called, duration and the like—this database would be updated very frequently.

These databases may be located on three separate and distinct computer systems (e.g. IBM Mainframe, Tandem fault tolerant system, UNIX minicomputer and so on) and in three different database formats (e.g. Oracle RDBMS, flat files, IMS database, and so on). Moreover, there is typically a great deal of application logic embedded in the billing system's legacy software code, which could be in the form of a COBOL program written in the 1960s, for calculating taxes, discounts, special calling charges and so on. Because of these complexities, it is generally not possible simply to read a database to get the required billing data. Even though it may be possible to recreate a bill for use in e-business from original data sources, this would generally require a re-creation of all of the functionality that exists in an organization's existing billing system. The cost and timeframe to do this would generally be prohibitive.

For use in legacy system integration and transition to e-commerce, specialized software tools known as parsers have been developed to extract data out of legacy file formats. The known parsers are monolithic in the sense that the parsing is performed by one large program (e.g. parser.exe) for all documents and file formats. The following example points out the inherent problems with this approach.

Figure 1:
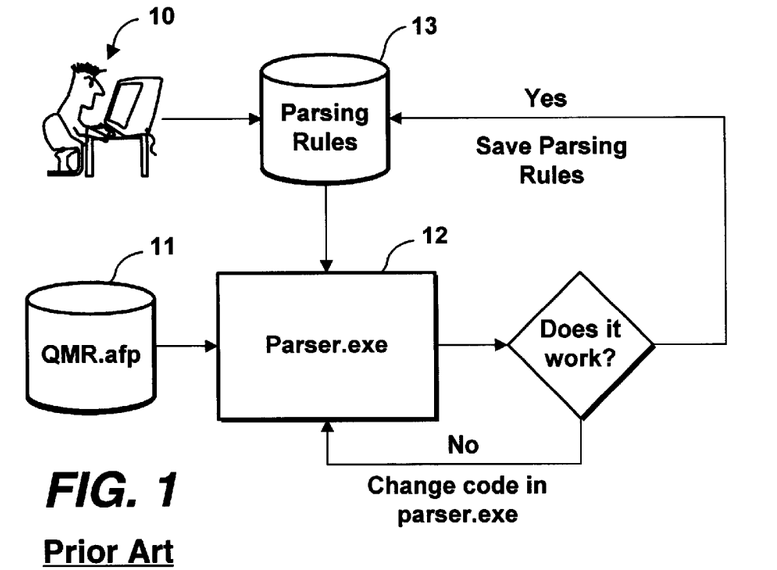
FIG. 1 is a high-level logic flow diagram showing the processing approach of prior art monolithic parsers.

Consider a company, for definiteness referred to as Acme Credit Card Corp., that wishes to make its Quarterly Management Report (QMR) available to customers over the Internet. The challenge is to parse the statement data out of the existing print stream created by Acme's legacy system. This print stream is located in a file called. QMR.AFP, which is in an IBM AFP file format. FIG. 1 shows the logical processing flow used by monolithic parsers.

When using a monolithic parser a developer/user 10 typically creates rules for parsing a data stream, which are applied by monolithic parsing engine 11. If these rules enable the parser to parse the input document QMR.afp from data source 12 successfully, the rules are saved in a rule base 13 and subsequently used in a production application to extract data out of the legacy format. The inherent problem with this approach is that, because of the extreme variability in legacy formats, such as print streams, it is virtually impossible to pre-define all possible rules for parsing data. In e-business applications such as EBPP, typically nothing less than 100% accuracy is acceptable. Vendors are compelled to update their parsers frequently to handle new rules. Furthermore, it may even be necessary to put customer-specific code into the monolithic parser. For example, if the Acme QMR document has an Acme-specific idiosyncrasy, which no pre-existing rule could handle, it then becomes necessary to add a new rule and update the parser code, or even worse, add custom Acme-specific code to the parser as shown in the following pseudo code listing.

If (customer="Acme Credit Card Corp."
    and document="Quarterly Management Report"
    and special condition exists) then execute custom parsing
      logic Although the custom code approach of the preceding listing might work, nevertheless putting customer-specific and document-specific code logic in a general-purpose utility is highly problematic from an engineering and quality control point of view. Such production parser code would constantly need to be updated for specific cases, making the parser overcomplicated, which will generally result in a higher number of programming bugs. Furthermore, the extra condition checking would tend to slow the parser operation. Moreover, the inclusion of customer-specific and document-specific code in a monolithic parser makes it unduly burdensome for a software vendor to offer the same parser to many different organizations.

SUMMARY OF THE INVENTION

The present invention provides a parsing technique that avoids the disadvantages of known monolithic parsers. Instead of embodying an all-encompassing rule base in parsing code for handling a variety of documents from a variety different types of input data streams, the present invention generates code specific to each input document and data stream type, which may then be updated as needed to handle document-specific idiosyncrasies without requiring modifications to the core parser code.

More specifically, as a user defines parsing rules for extracting data from a representative sample document, the invention automatically generates source code in the background that is specific to that document and that embodies the rules for extracting data from that particular document. The generated code may be modified manually as needed to account for any idiosyncratic conditions associated with the document. The code so produced is generally referred to herein as filer source code, or in executable form as executable filer code, or simply as a filer. Each representative document has associated with it its own filer. A parsing engine according to the invention comprises a collection of such individual filers appropriate for the types of documents that arise in any given organization. A mapping or other association is maintained between representative document types and their filers. In regular operation, a user selects a data set to be extracted from certain documents. When the parsing engine receives a document in an input data stream, the associated filer is loaded and parses that document for the selected data set. Then another filer is loaded in response to another input document, and so on. The filers may be especially efficiently generated using an object-oriented approach and then dynamically instantiated at run time as is supported, for example, by the Java programming language.

DETAILED DESCRIPTION OF ILLUSTRATIVE EMBODIMENTS

Figure 2:
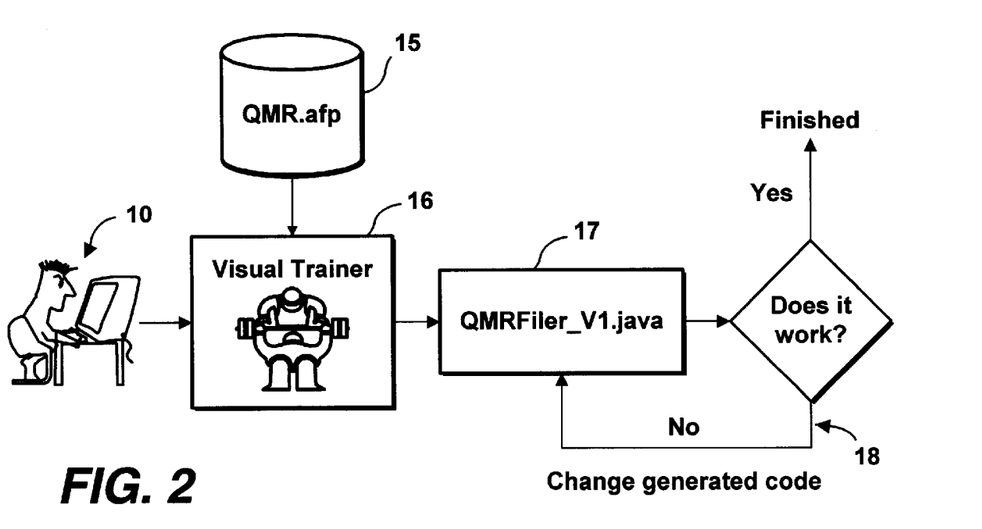
FIG. 2 is a high-level logic flow diagram illustrating the parsing approach according to the invention.

FIG. 2 illustrates the logical process flow for creating a filer for the QMR.afp document file according to the invention. User 10 starts by opening the QMR.afp file from document repository 15 in an application referred to herein as a visual trainer 16. Visual trainer 16 enables user 10 to define the parsing rules for a particular document (an activity sometimes referred to as training a document) and generates the initial filer code for that document. Visual trainer 16 displays the print file to user 10 at a display monitor the same as it would appear in a hard copy printout. The user visually defines the data (e.g. text fields) that should be extracted from the input stream as well as any other aspects concerning the AFP data stream, such as page breaks, images and the like. Once the input AFP data stream has been fully defined in this manner, the visual trainer generates the filer source code that can be used to parse the document. In FIG. 2 the filer code is shown at block 17 as the file QMRFiler_V1.java.

It is an advantage of the invention that if the filer code so generated does not extract the desired data from the AFP file with 100% accuracy, the filer can readily be updated by changing the filer code, as indicated at loop 18 in FIG. 2. By expressing the rules for parsing data streams in a high-level programming language, the present approach makes it possible to handle the numerous idiosyncrasies of complex legacy file formats, such as print streams. Even if the visual trainer tool used is not 100% effective, a filer developer can always add custom code to the data-stream-specific filer because the filer developer can always update the document-specific filer code without having to resort to modifying the core code of the general-purpose tool. Another benefit of the invention is that the document-specific code will not only be more flexible than the general-purpose code of a monolithic parser, but it will also tend to be faster since it can be tuned for a particular input stream. When the filer code is generated using an object oriented approach and then dynamically instantiated (as is conveniently performed in the Java programming language), filer classes can be automatically and efficiently loaded by a running program without requiring a separate, time-consuming and disruptive compile-link-and-load sequence.

For clarity of exposition, an embodiment of the invention will now be illustrated in the example of a fictitious company called Acme Corp, which produces a generic monthly bill. The Acme Corp legacy system produces a print file in the Acme Presentation Format referred to here as APF. As the name suggests, this legacy print file format is a fictitious format used for the purpose of illustration. The following listing shows the APF bill print file from Acme:

COM:Sample Alysis Print Format (APF) file

PTX:Acme Bill POS:1,40 FON:TimesRoman

PTX:To Jim Flynn POS:3,20 FON:Arial

PTX:Amount Due POS:5,20 FON:TimesRoman

PTX:$ POS:4,35 FON:Arial

PTX:200 POS:4,36 FON:Courier

PTX:. POS:4,37 FON:TimesRoman

PTX:00 POS:4,38 FON:Courier

PGB:

PTX:Acme Bill POS:1,40 FON:TimesRoman

PTX:To Bill Clarke POS:3,20 FON:Arial

PTX:Amount Due POS:5,20 FON:TimesRoman

PTX:$ POS:4,35 FON:Arial

PTX:300 POS:4,36 FON:Courier

PTX:. POS:4,37 FON:TimesRoman

PTX:00 POS:4,38 FON:Courier

The preceding APF file is typical of some print stream formats. As may be seen from the listing, control and formatting information is encapsulated in the file along with the text that will be printed on the page. The following table describes the formatting commands for APF format files.

TABLE I

| Formatting Command | Description | Parameters |
| --- | --- | --- |
| COM: | Comment | The comment text that follows the formatting command. This text does not appear on the printed page. |
| PTX: | Presentation text item | The text to be printed immediately follows the formatting command. A POS: formatting command A FON: formatting command |
| POS: | Position an the printed page to add the preceding presentation text | The line number, followed by a comma, followed by a column |

TABLE I-continued

| Formatting Command | Description | Parameters |
|---|---|---|
| FON: | The font to display the preceding presentation text in | The font name |
| PGB: | Page break | N/A |

Figure 3:
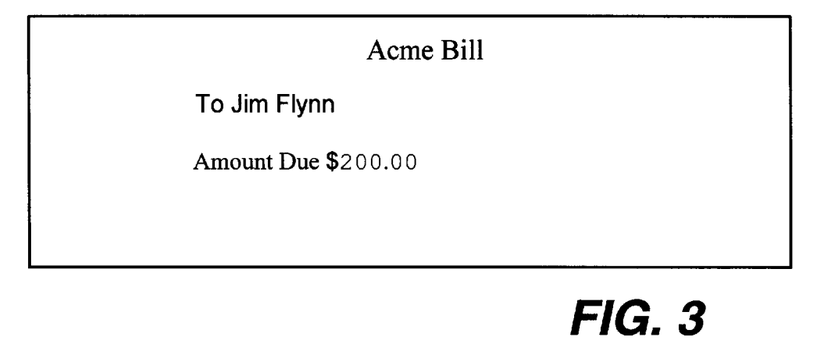
FIG. 3 is the first page of a print data stream output in a simple example.

The APF file in this example may be understood from the preceding table. The first page of the output when the file is printed is shown in FIG. 3.

A complicating point illustrated by this example is that the information shown on a printed page is not necessarily located in one part of the physical print file. In this example, the data in the print file is separated by font. In fact, in many real-world instances print file composition engines sort print files by font, which serves to optimize printing speed. The following listing shows the sorted version of the print file in this example, which would produce identical output to the non-sorted version.

COM:Sample Alysis Print Format (APF) file sorted for optimization
    PTX:Acme Bill POS:1,40 FON:TimesRoman
    PTX:Amount Due POS:5,20 FON: TimesRoman
    PTX:. POS:4,37 FON:TimesRoman
    PTX:To Jim Flynn POS:3,20 FON:Arial
    PTX:$ POS:4,35 FON:Arial
    PTX:200 POS:4,36 FON:Courier
    PTX:00 POS:4,38 FON:Courier
    PGB:
    PTX:Acme Bill POS:1,40 FON:TimesRoman
    PTX:Amount Due POS:5,20 FON: TimesRoman
    PTX:. POS:4,37 FON:TimesRoman
    PTX:To Bill Clarke POS:3,20 FON:Arial
    PTX:$ POS:4,35 FON:Arial
    PTX:300 POS:4,36 FON:Courier
    PTX:00 POS:4,38 FON:Courier As illustrated by the preceding print file, the text for a dollar amount might utilize three different fonts (i.e. one for the currency symbol, one for the numbers and another for the decimal place) which would be physically located in three different sections of the file. The sorted version of the print file illustrates that, even in this simplified illustrative example, parsing data out of these types of formats is not straightforward.

Building a Filer

As indicated above, "filer" is the general term used for the document-specific parsing code for extracting data out of an input data stream according to the invention. More generally, in the language of object oriented systems it may also refer to a filer class for defining such parsing code. All of the rules for parsing a data stream are expressed directly in a filer's source code. The Java programming language is well suited for developing filers because of its support for dynamic instantiation. This makes it possible to utilize the filer program in another application without re-compiling the e-business application. Nevertheless, those skilled in the software arts will recognize that the same effective functionality may be achieved in other languages such as C++ by using the techniques appropriate for those languages, for example, dynamic link libraries (DLLs) in C++.

A simplified embodiment of a visual trainer tool is now described for generating filer code which illustrates the principles of the invention. Given the benefit of the examples and teachings provided herein, those skilled in the art will be able to develop more complicated visual trainer tools for various legacy formats. The visual trainer tool used in this example can view "Acme Presentation Format" (APF) files and generate filer code for APF files.

To create a filer by using the APF visual trainer, the user first opens a sample APF file. The APF visual trainer displays the APF file as it would appear if printed. This is sometimes referred to as a WYSIWYP display (What You See Is What You Print). The user begins to visually define the data desired to be extracted. The trainer provides a Select Text mode, which may be activated from a pull-down menu. The desired text fields may be highlighted with a mouse, for example, and the trainer will embed an appropriate rule in the filer code for extracting the selected text fields. Other data fields may also be directly or indirectly defined, for example, through conditional logic. An example of such conditional logic is given below where for purposes of illustration it is inserted manually into filer code, although it may be incorporated into the automatic code-generating capability as well. The areas of a document from which data may be eligible to be extracted are sometimes referred to as extraction data fields. An extraction data field may alternatively be defined by its location relative to any characteristic element of the document, serving as an anchor, such as a dollar sign or a particular heading. The implementation of methods for directly and indirectly defining extraction data fields in a document is known in the art, as it is practiced also in connection with known monolithic parsers, and thus need not be described in any detail here.

Before the APF visual trainer can generate a filer, all of the possible extraction data fields should be directly or indirectly defined. The next step is to generate the filer source code. This may be accomplished by activating the APF visual trainer "Publish Filer" mode, typically from a pull-down menu. The Publish Filer mode generates the source code specific to the particular sample document used to define the extraction data fields. The source code embodies the rules for extracting data from the extraction data fields. The visual trainer converts the filer source code to executable filer code and places the executable filer code in a filer repository 20 (see FIG. 5) for later use in parsing documents like the sample document arising in real-time APF input data streams.

At the same time the system maintains an association between the filer just generated and the sample document and input data stream type (here, APF) so that when this particular document arises in this particular input data stream type, the system will be able to load the relevant filer code. The association of filers with their documents and data stream types may be maintained for example through a simple mapping or database structure, the provision of which is entirely routine and need not be disclosed in any detail here.

The filer published by the APF Visual trainer is composed of Java source code that can parse the input data stream. The next section describes typical code generation by the APF visual trainer along with the supporting classes for the present illustrative example.

Filer Classes

Figure 4:
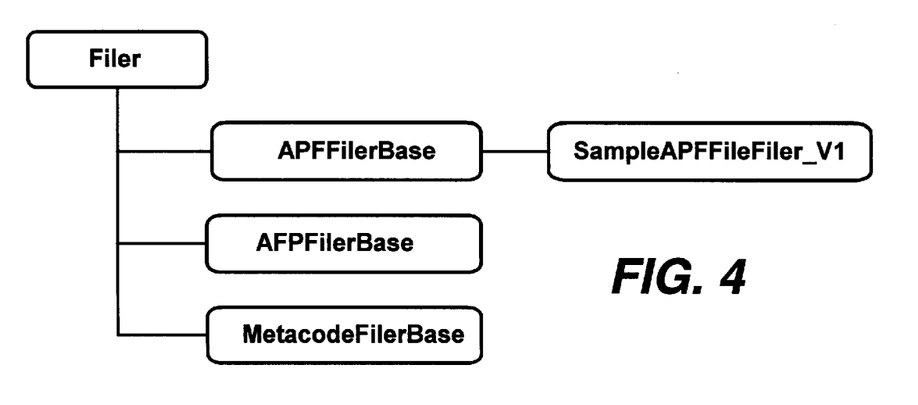
FIG. 4 shows a filer class hierarchy.

A particularly convenient and efficient way to implement filers is within an object-oriented framework, such as the Java programming language, which will be used here for purposes of illustration. FIG. 4 illustrates a filer class hierarchy. As is evident from FIG. 4, the base object of all filers is the "Filer" class. In the present example, a filer is more generally provided by a Java interface. An interface is a known concept in the Java language; it defines all of the methods that must be implemented by any class that "implements" the interface. The following listing shows the code for the Filer interface.

```
public interface Filer
{
    void setInputName(String inputFileName);
    void parseInput() throws Exception;
}
```

Figure 5:
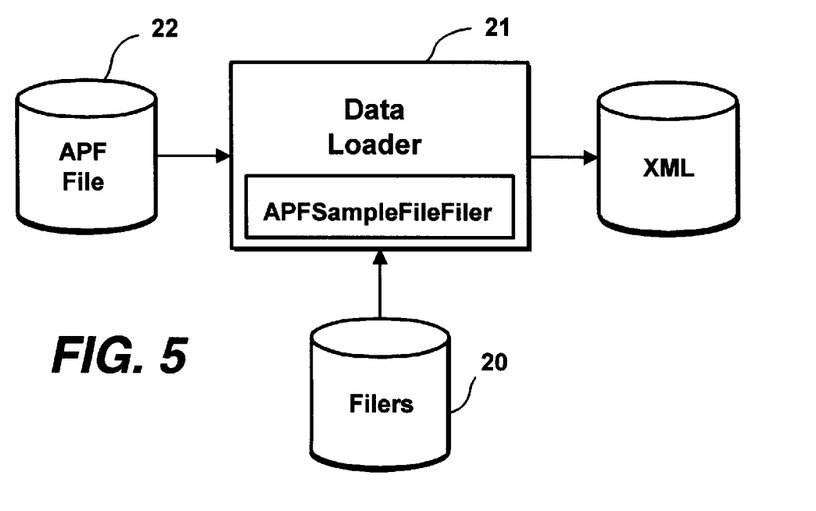
FIG. 5 is a block diagram showing the conversion of APF documents to XML documents.
Figure 6:
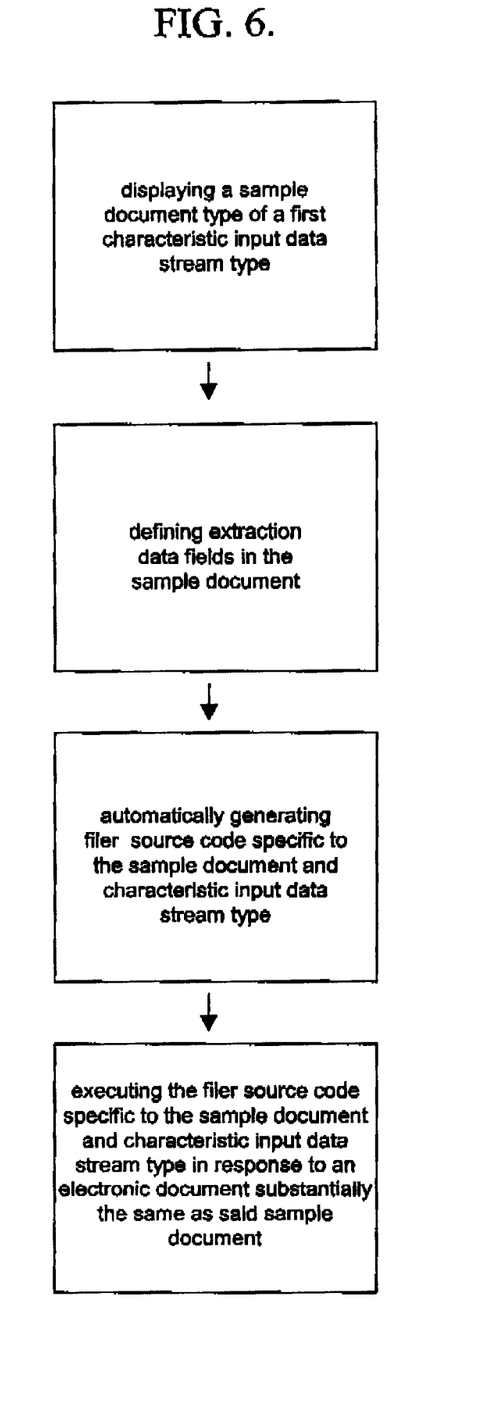
FIG. 6 is a flow diagram of a preferred embodiment.
Figure 7:
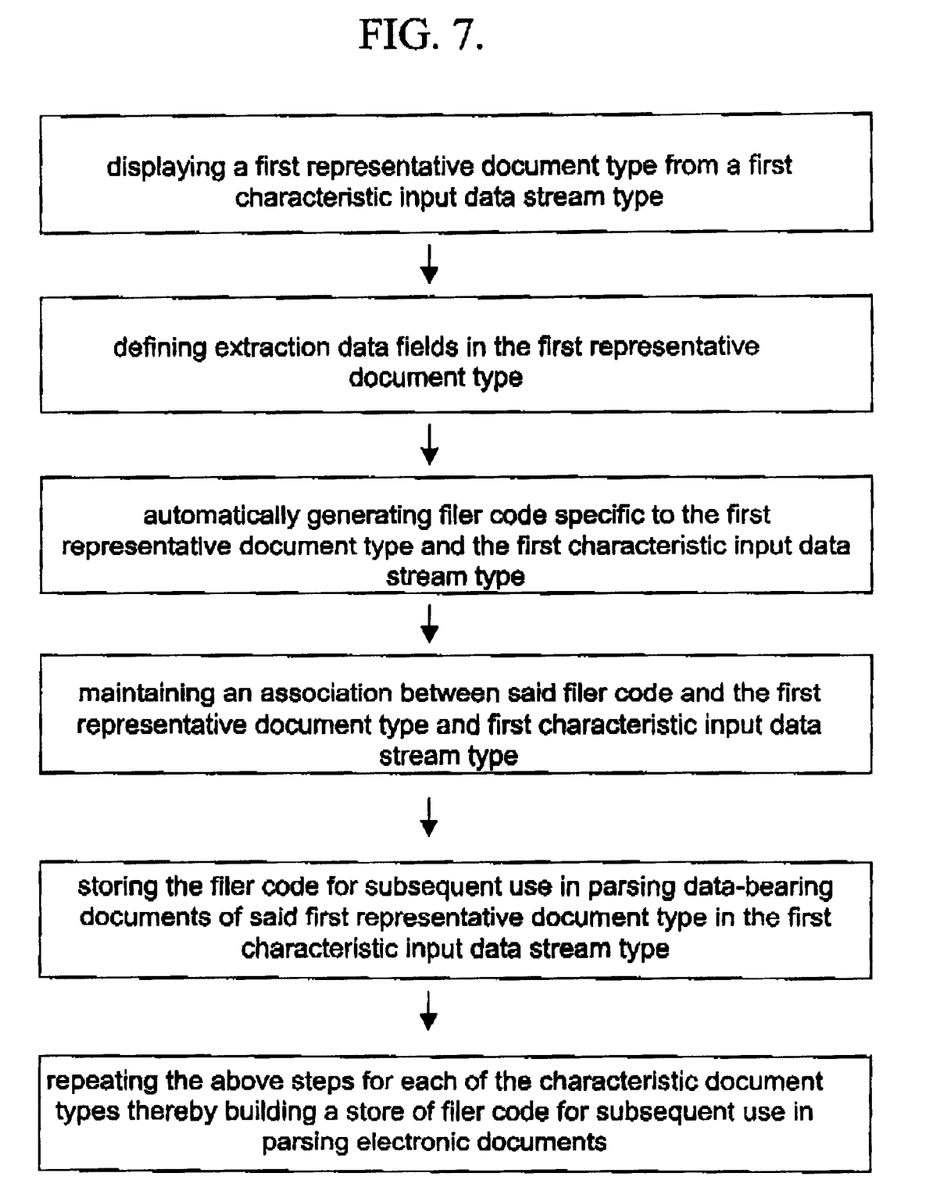
FIG. 7 is a flow diagram of a preferred embodiment.

As can be seen from the Filer interface, any filer class simply needs to provide method implementations for setInput( ) and parseInput( ). Because all filers must implement these methods, a separate application could dynamically instantiate a special-purpose filer and use it to parse an input data stream later on. An XML conversion program, for example, can use the SampleAPFFiler_V1 to convert APF documents to XML documents, which can then be used more easily in electronic commerce applications. FIG. 5 illustrates this conversion process.

The first step occurs when a Data Loader application 21 detects that an APF file is ready to be converted to XML. This could occur, for example, when the APF file is copied into a predefined directory 22, which may be periodically polled by Data Loader 21. To convert the APF file, the Data Loader dynamically instantiates the APFSampleFileFiler class and uses it to convert the APF file to XML by calling the APFSampleFileFiler object's setInput( ) and parseInput( ) methods. Since the APFSampleFileFiler is a "Filer" object (i.e. it implements the Filer interface), the Data Loader can always call the Filer methods—regardless of the filer type—without having to know anything about the implementations of these methods.

The immediate base class of the APFSampleFileFiler is the APFFilerBase class. This class is shown in the following listing.

```
public class APFFilerBase implements Filer
{
    public APFFilerBase()
    {
    }
    public void setInputName(String name)
    {
        inputFileName = name;
    }
    public void parseInput() throws Exception
    {
    }
    String inputFileName = "";
}
```

As can be seen from the APFFilerBase class, its only action is to set a class attribute called inputFileName in the setInput( ) method. This is so here because in the present illustrative implementation all APF data will be input simply as disk-based files. No limitation is intended, however, to disk-based files, and those skilled in the art will readily be able to configure implementations for other inputs.

Now that the basic filer class hierarchy in our example has been described, we consider the code for a program and file called SampleAPFFileFiler_V1.java, illustrative of code which may be generated by the APF visual trainer. This code is shown in the following listing.

```
import java.io.*;
public class SampleAPFFileFiler_V1 extends APFFilerBase
{
    /*
        The APF visual trainer generated this class automatically.
        It is strongly recommended that you do not delete any of
        the comments in this document.
        Parsing rules are preceded by a "RULE--" comment. You can
        add your own customized rules in this section. Other
        generated lines of code are preceded by "AUTO--" comments.
        XML rules are also included in this class in order to help
        parse the code for subsequent invocations of the APF
        visual trainer.
    */
    public SampleAPFFileFiler_V1()
    {
        super();
    }
    public void parseInput() throws Exception
    {
        /*AUTO--*/  LineNumberReader reader =
        /*AUTO--*/      new LineNumberReader( new FileReader(
        /*AUTO--*/          inputFileName ) );
        /*AUTO--*/  String line = reader.readLine();
        /*AUTO--*/  String text = "";
        /*AUTO--*/  while ( line != null )
        /*AUTO--*/  {
        /*AUTO--*/      line = reader.readLine();
        /*AUTO--*/      if ( line.startsWith( "PTX:Acme Bill
        /*AUTO--*/          POS:1,40" ) )
        /*AUTO--*/      {
        /*AUTO--*/          while ( !line.startsWith("PGB:") )
        /*AUTO--*/          {
        /*AUTO--*/              text += line;
        /*AUTO--*/              line = reader.readLine();
        /*AUTO--*/          }
        /*AUTO--*/          APFDocument apf = new
        /*AUTO--*/          APFDocument ( text );
                            applyRules (apf);
        /*AUTO--*/      }
        /*AUTO--*/  }
    }
    void applyRules(APFDocument apf)
    {
        /* Stat of parsing rules */
        /*RULE1--*/ String name = apf.getText( 3, 20, 40 );
        /*RULE2--*/ String amountDue = apf.getText( 5, 20, 30 );
        /* End of parsing rules */
        /*AUTO--*/ XMLDocument xml = new XMLDocument
        /*AUTO--*/   ("Acme Bill For" + name );
        /*AUTO--*/ xml.addElement( "name", name );
        /*AUTO--*/ xml.addElement( "amount-due", amountDue );
        /*AUTO--*/ xml.save();
    }
    /* Start of auto-generated XML rules
        <parsing-rules>
            <file type="apf"/>
            <document delimiter="PGB:"/>
            <rules>
                <gettext id="RULE1" line="3" start="20" end="40"/>
                <gettext id="RULE2" line="5" start="20" end="30"/>
            </rules>
        </parsing-rules>
        End of auto-generated XML Rules */
}
```

A description is now given of a few aspects of the SampleAPFFileFiler_V1.java program. First, since it extends the APFFilerBase class, it automatically inherits the setInput( ) method implementation in that class as well as the inputFileName class attribute. The most interesting parts of the SampleAPFFileFiler_V1 class are the parseInput( ) and applyRules( ) methods.

In the present example, the entire implementation of the parseInput( ) method was generated by the APF visual trainer. Each line of code is preceded by a characteristic /*AUTO—*/ comment, which indicates that the code was generated automatically by the visual trainer. These comments are included in the class to demark the automatically generated code distinguishing it from any manually inserted code so that when the visual trainer is subsequently used to edit SampleAPFFileFiler_V1, the visual trainer will be able to distinguish the code that was auto-generated from custom code logic that may be added by a developer.

The XML rules are also included as a comment at the end of the class. These rules represent the standard parsing logic that was generated by the APF visual trainer. When the visual trainer is used to "edit" the SampleAPFFileFiler_V1.java program, it can re-build all of the rules by reading the XML metadata and rules. This is so because XML is much easier to parse than the Java code in the class. In general, filer source code will also include appropriate method calls to skip over unselected document elements to the selected data fields.

The next section describes how custom rules may be manually inserted into an automatically generated filer.

Adding Custom Parsing Rules to a Generated Filer

In many cases it may become necessary to insert custom rules into a generated filer. This may be required if the input data stream contains unique idiosyncrasies that cannot, or simply are not, handled by the existing tool. Suppose, for example, that Acme provides bonus reward points to customers that are members of the "platinum" program. It would be desirable to pass this information along so that it becomes part of the resultant XML document. But since not all customers are members of the platinum program, the APF visual trainer was not devised to generate this kind of conditional logic. The requisite logic may nevertheless be added to the auto-generated filer as a custom rule. In fact, such conditional logic may also be included in the visual trainer code-generating capabilities, as skilled programming practitioners will recognize, but for purposes of illustrating code customization this capability is added here manually.

To add a custom rule to the SampleAPFFileFiler_V1 class, one can simply edit the applyRules( ) method. An example of an inserted rule is shown in the following listing.

```
void applyRules(APFDocument apf)
{
    /*AUTO--*/ XMLDocument xml = new XMLDocument
    /*AUTO--*/    ("Acme Bill Number" + count++ );
    /* Stat of parsing rules */
    /*RULE1--*/ xml.addElement( "name", apf.getText( 3, 20, 40
) );
    /*RULE2--*/ xml.addElement( "amount-due", apf.getText( 5,
20, 30 ) );
        if ( apf.getText( 7, 20, 31 ).equals( "Bonus Points" ) )
            xml.addElement( "bonus-points", apf.getText( 7, 33, 38
) );
    /* End of parsing rules */
    /*AUTO--*/ xml.save();
}
```

When the filer is run again, it will see that a custom rule has been inserted. Because this rule has not been defined in the XML rules, the filer knows that this code should be preserved. To ensure that this code is clearly marked, the visual trainer may also add a custom rule when it saves the filer. In addition, if the programmer fails to insert a standard "/*CUST—*" comment before any custom rule lines, the visual trainer can do it, as shown in the following code snippet.

```
void applyRules(APFDocument apf)
{
        /*AUTO--*/ XMLDocument xml = new XML
Document("Acme Bill Number" + count++ );
        /* Stat of parsing rules */
        /*RULE1--*/ xml.addElement( "name", apf.getText
( 3, 20, 40 ) );
        /*RULE2--*/ xml.addElement( "amount-due", apf.
getText( 5, 20, 30 ) );
        /*CUST1--*/ if ( apf.getText( 7, 20, 31 ).equals
( "Bonus Points" ) )
        /*CUST1--*/    xml.addElement( "bonus-points",
apf.getText( 7, 33, 38 ) );
        /* End of parsing rules */
        /*AUTO--*/ xml.save();
}
```

The XML metadata in the document would be represented as follows.
```
<parsing-rules>
    <file type="apf"/>
    <document delimiter="PGB:"/>
    <rules>
        <gettext id="RULE1" line="3" start="20" end="40"/>
        <gettext id="RULE2" line="5" start="20" end="30"/>
        <customrule id="CUST1"/>
    </rules>
</parsing-rules>
```

This example demonstrates yet another advantage of the invention: any input data stream can be successfully parsed, regardless of the auto-code-generating capabilities of the visual trainer used.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, while an embodiment of the invention has been described here in terms of the Java programming language, no limitation to that language is intended. Thus, the invention is not to be limited to the above description and illustrations, but is to be defined by the following claims.

What is claimed is:

1. A method of parsing electronic documents for selected data, each said electronic document being represented by an input data stream of characteristic type, comprising the steps of:
    displaying a sample document of a first said characteristic input data stream type;
    defining extraction data fields in said sample document;
    automatically generating filer source code specific to said sample document and said first characteristic input data stream type, said automatically generated source code embodying rules for extracting data from said extraction data fields; and
    executing said filer source code specific to said sample document and characteristic input data stream type in response to an electronic document substantially the same as said sample document in an input data stream of said first characteristic type to extract selected data therefrom.

2. The method of claim 1, further comprising the step of:
    manually inserting custom source code into said automatically generated filer source code for handling special conditions for data extraction.

3. The method of claim 2, further comprising the steps of:

demarking lines of said source code so as to distinguish said automatically generated source code from said manually inserted source code; and overlaying only said automatically generated source code on subsequent runs of said steps of defining extraction data fields and automatically generating filer source code, whereby any said custom source code will be preserved.

4. The method of claims 3, wherein said demarking step comprises the step of preceding each line of said automatically generated filer source code with a characteristic comment code, thereby to distinguish said source codes.

5. The method of claim 1, further comprising the steps of:

converting said filer source code to executable filer code;

making said executable filer code available from a filer repository;

providing an association between individual filers in said repository and said sample document and input data stream type from which each said filer was derived; and instantiating a filer from said repository in response to an associated document in an input data stream.

6. A method of preparing to parse selected data from electronic documents, each said electronic document being represented by an input data stream of characteristic type, comprising the steps of:

displaying a first representative document type of a first said characteristic input data stream type;

defining extraction data fields in said first representative document type;

automatically generating filer code specific to said first representative document type and said first characteristic input data stream type, said automatically generated filer code embodying rules for extracting data from said extraction data fields;

maintaining an association between said filer code and said first representative document type and first characteristic input data stream type; and storing said filer code for subsequent use in parsing data-bearing documents of said first representative document type and said first characteristic input data stream type.

7. The method of claim 6 wherein each said electronic document is one of a plurality of characteristic document types, the method further comprising the steps of:

maintaining an assemblage of stored filer code specific to each said characteristic document type;

presenting for parsing an electronic document of one of the plurality of characteristic document types; and selecting at least one extraction data field in said electronic document; and executing stored filer code specific to the corresponding characteristic document type of the presented electronic document to extract data from said at least one selected extraction data field.

8. A method of preparing to parse selected data from electronic documents, wherein said electronic documents are of a plurality of characteristic document types and are represented by a plurality of characteristic input data stream types, comprising the steps of:

displaying a first representative document type from a first characteristic input data stream type;

defining extraction data fields in said first representative document type;

automatically generating filer code specific to said first representative document type and said first characteristic input data stream type, said automatically generated filer code embodying rules for extracting data from said extraction data fields;

maintaining an association between said filer code and said first representative document type and first characteristic input data stream type;

storing said filer code for subsequent use in parsing data-bearing documents of said first representative document type in said first characteristic input data stream type; and repeating the above steps for each of said characteristic document types thereby building a store of filer code for subsequent use in parsing said electronic documents.

9. The method of claim 8 wherein said step of automatically generating said filer code specific to each said representative document type and characteristic input data stream type comprises the substeps of:

providing a filer object class including a parsing method; and automatically providing an implementation of said parsing method for each said representative document type and each said characteristic input data stream type, said implementation embodying rules for parsing said extraction data fields defined in said defining step.

10. The method of claim 9 further comprising the step of providing a separate filer base class corresponding to each said characteristic input data stream type.

* * * * *